US00RE35571E

United States Patent [19]

McLeese

[11] E Patent Number: Re. 35,571

[45] Reissued Date of Patent: Jul. 29, 1997

[54] SELF-ERECTING STRUCTURE

[76] Inventor: Eddie S. McLeese, 1811 Alabama St., No. A, Huntington Beach, Calif. 92648

[21] Appl. No.: 384,375

[22] Filed: Feb. 3, 1995

Related U.S. Patent Documents

Reissue of:

[64] Patent No.: 4,858,634
Issued: Aug. 22, 1989
Appl. No.: 223,889
Filed: Jul. 18, 1988

U.S. Applications:

[63] Continuation of Ser. No. 379,697, Mar. 29, 1993, abandoned, which is a continuation of Ser. No. 747,187, Aug. 19, 1991, abandoned.

[51] Int. Cl.[6] ..... E04H 15/40

[52] U.S. Cl. ..... 135/126; 135/905; 135/143

[58] Field of Search ..... 135/102, 104, 135/106, 108, 109, 905, 116, 126, 143

[56] References Cited

U.S. PATENT DOCUMENTS

| | | | |
|---|---|---|---|
| 368,206 | 8/1887 | Hardy | 135/102 |
| 2,864,388 | 12/1958 | Oliver | 135/905 |
| 2,864,390 | 12/1958 | Oliver et al. | 135/905 |
| 2,961,802 | 11/1960 | Morgan et al. | 135/102 |
| 3,009,471 | 11/1961 | Rossiter | 135/88 |
| 3,082,780 | 3/1963 | Macy | 135/102 |
| 3,534,750 | 10/1970 | Kolozsvary | 135/102 |
| 3,665,944 | 5/1972 | Knapp | 135/102 X |
| 3,675,667 | 7/1972 | Miller | 135/1 R |
| 3,848,615 | 11/1974 | Warner et al. | 135/102 |
| 3,889,698 | 6/1975 | Roessl | 135/102 X |
| 3,960,161 | 6/1976 | Norman | 135/1 R |
| 3,990,463 | 11/1976 | Norman | 135/104 |
| 4,058,133 | 11/1977 | Barr et al. | 135/4 A |
| 4,154,253 | 5/1979 | McCullough | 135/102 |
| 4,224,754 | 9/1980 | Derryberry | 135/102 X |
| 4,569,362 | 2/1986 | Fidler, Jr. | 135/104 |
| 4,585,020 | 4/1986 | Masuda et al. | 135/95 |
| 4,605,029 | 8/1986 | Russell | 135/104 |
| 4,796,649 | 1/1989 | Tolomay | 135/102 |
| 4,825,892 | 5/1989 | Norman | 135/104 |
| 5,038,812 | 8/1991 | Norman | 135/104 |

FOREIGN PATENT DOCUMENTS

| | | | |
|---|---|---|---|
| 18160 | of 1903 | United Kingdom | 135/102 |

*Primary Examiner*—Carl D. Friedman
*Attorney, Agent, or Firm*—Fish & Richardson PC

[57] ABSTRACT

A self-erecting tent structure having a first substantially circular member of a certain dimension and providing at least a second circular member for attachment thereto. The second circular member is attached a points along the length of the first member by constraining the first circular member with a tie forming the circle into an ellipse of a desired dimension. A second circular member is constrained also into an ellipse with the ends portions of the circle formed into a "saddle shaped" by equally elevating the opposite ends of the longer axis of the ellipse of the second member; and aligning the "saddle shaped" member with the convexed side upward over the first elliptical member so that the bottom arcs of the saddle touch and are congruent with the opposite sides of the shorter axis of the first elliptical member. This saddle shaped member is then attached to the first elliptical member at the points where the two members meet, which are substantially equal on opposite sides of the member.

12 Claims, 4 Drawing Sheets

SELF-ERECTING STRUCTURE

Matter enclosed in heavy brackets [ ] appears in the original patent but forms no part of this reissue specification; matter printed in italics indicates the additions made by reissue.

*This is a continuation of application Ser. No. 08/379,697 filed on Mar. 29, 1993, abandoned, which is a continuation of Ser. No. 07/747,187 filed Aug. 19, 1991, abandoned, which is a reissue of 07/223,889 filed Jul. 18, 1988 (U.S. Pat. No. 4,858,634).*

BACKGROUND OF THE INVENTION

1. Field of the Invention

The present invention relates to structures, such as tents, more particularly, the present invention relates to a tent, including a frame constructed of formable members, so that the tent is instantaneously self-erecting from its stored configuration, and can easily be restored to its storage configuration.

2. General Background

Tents and other such portable shelters are quite widespread in use, both on a recreational level and for use in practical applications such u the military. Due to the nature in which tents are utilized, a tent must be lightweight, strong, and yet able to withstand the forces of nature once it is erected. One constant problem, even with modern day tents, is the manner in which the tent must be erected, since the tent framework itself, even in the present state of the art, it in most cases separate and apart from the fabric covering of the tent, and therefore must be erected independently so that the tent fabric may be supported by the framework. Because of the nature of this interdependence, the erection of most tents is a time-consuming and tedious task, which is difficult to accomplish under certain inclement weather conditions, or during the dark hours.

Therefore, there is a growing need for a tent structure or the like which is quick and easy to erect, yet provides a substantial structure which can utilized as a tent in a very short time.

Several patents have been found in a search of the art, which are pertinent to the present invention. These patents are as follows:

U.S. Pat. No. 3,960,161 issued to Norman, entitled "Portable Structure", relates to a tent having a single continuous loop, in the preferred embodiment, which is springy in nature, and can be a flat spring steel stock and forms the shape in the open position generally, corresponding to the periphery of a saddle. The frame is therefore draped in the tent fabric, and may be folded up into the closed position to form a ring formation storage. Upon unfolding, the ring springs into the "saddle" shape, with the upper portions of the ring serving as the ends of the tent. The tent is then secured at the four lower corners through pegs, and serves as a functional tent.

U.S. Pat. No. 3,990,463 also issued to Norman, entitled "Portable Structure", likewise teaches the use of a continuous loop of spring steel, forming the basis of the framework or the tent, however, with the spring steel formed in the formation of a figure "8", with the central portion of the figure "8" serving as the apex of the tent, and the loops of the "8" extending down to form the side base of the tent. That closed figure "8" is then draped in tent fabric, and like the former patent, when in the open position the figure "8" serves as the framework supporting the tent; also four corners of the tent are then pegged down to form the structure.

On both of these patents, it is required in each case that the final tent product be secured to the ground at the four corners, since neither [patents teach] *patent teaches* the use of base member for support as the base of the tent.

U.S. Pat. No. 3,675,667 issued to Miller, entitled "Self Erecting Tent", also teaches the use of a self-erecting tent which has a closed loop, having the length of the loop traveling along the base of the tent, and the two ends of the loop extending upward to form the two rear and front entrances of the tent. As with the former patents, this particular framework is a closed loop, and can be stored away by deformation of the closed loop into circular portions for a substantially flat storage configuration. This particular patent, like the former two patents, likewise fails to teach the use of a base member which is continuous around the tent for forming the base of the tent, and yet allowing the tent to be of a height where one can move about in the upright position.

The following list are other patents found in the search which may be pertinent:

| U.S. Pat. No. | INVENTOR | TITLE |
|---|---|---|
| 4,605,029 | Russell | "Self-Supporting Outdoor Sleeping System" |
| 4,585,020 | Masuda | "Self-Contained Tent" |
| 4,058,133 | Barr | "Self-Contained Tent Assembly" |
| 2,864,388 | Oliver | "Self-Erecting Tent" |
| 2,864,390 | Oliver | "Self-Erecting Tent" |

SUMMARY OF THE PRESENT INVENTION

What is provided is a self-erecting tent structure having a first substantially circular member of a certain dimension which contacts the surface upon which the tent would set at substantially all points, and providing at least a second circular member for attachment thereto. The second circular member is attached at at least two points along the length of the first member by constraining the first circular member with a tie forming the circle into an ellipse of a desired dimension. The second circular member is constrained also into an ellipse with the ends portions of the circle formed into a "saddle shape" by equally elevating the opposite ends of the longer axis of the ellipse of the second member; and aligning the "saddle shaped" member with the [convexed] *convex* side upward over the first elliptical member so that the bottom arcs of the saddle touch and are congruent with the opposite sides of the shorter axis of the first elliptical member. This saddle shaped member is then attached to the first elliptical member at the points where the two members meet, which are substantially equal on opposite sides of the member.

There is then further provided a tent covering of suitable fabric, having a floor portion and a continuous side wall portion so that the first elliptical base member serves as the formed base for the tent resting on the surface beneath the tent, and the saddle shaped second elliptical member serves as the framework to support the fabric of the tent into a formed tent upright position. The tent fabric, of course, is then provided with a suitable opening for ingress and egress into the tent that is formed by the framework and the fabric.

In additional embodiments, there may be provided at least a third elliptical member which likewise is formed at the same attachment points as the base member, but rises up a distance at its longest axis point above the first member to serve as an intermediate framework between the upper saddle shaped member and the base member in order to provide a boarder and more dome shaped tent structure.

The invention also includes a tent structure which may erect from the storage configuration to the full erected configuration by the self-reforming of the tent framework into a first base ring, and at least a second support ring, attached at least along two points of the base ring, and defining the framework for supporting the tent fabric thereupon for accommodating a person therewithin.

Therefore, it is a principal object of the present invention to provide a self-erecting tent structure which is erectable from the storage configuration to the full erected configuration in a matter of seconds through instantaneously reformation of the frame member[;].

It is a further principal object of the present invention to provide a self-erecting tent structure which may be stored in a compact ring configuration, and through reformation of the frame would achieve instantaneously erection, including a base portion, a support portion, and a fabric tent covering including a entry port thereinto[;].

It is a further object of the present invention to provide a self-erecting tent made of at least two elliptical bendable closed loop ring members attached to at least two points, the first ring member forming the base tent, the second ring member forming substantially the upright support portion of the tent framework[;].

It is a further object of the present invention to provide a self-erecting tent structure which can be easily folded from the fully erected state to a closed circular compact storage state efficiently and easily, for storage[;].

It is a further object of the present invention to provide a design structure for a tent which provides a portable, utilitarian, structurally elegant, reusable, [selferecting] *self-erecting* tent for shelter which can be easily and quickly collapsed into portable compact and lightweight configuration[;].

It is a further object of the present invention to provide a structure which may serve as a shelter substantially instantaneously from the storage configuration to the full upright erected configuration when needed.

These and other objects of this invention will be readily apparent to those skilled in the art from the detailed description and claims which follow.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
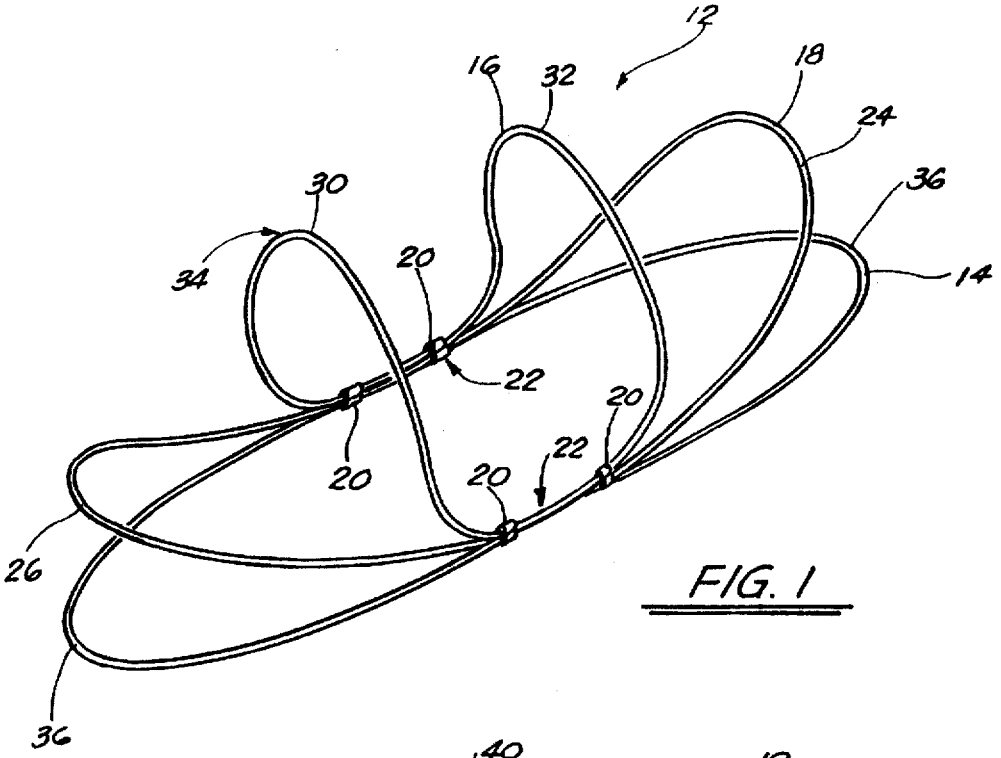
FIG. 1 illustrates a three closed loop ring framework configuration of the preferred embodiment of the self-erecting tent of the present invention.

FIGS. 1–7 illustrate various views of the preferred embodiment of the self-erecting tent of the present invention. What is most critical in the present invention is the configuration of the skeletal framework 12, as seen in FIG. 1 which comprises the frame for tent structure 10 ass seen in FIG. 2. As illustrated in FIG. 1, self-erecting framework 12 includes a first closed loop base ring 14, a second "saddle shaped" tent support ring 16 and an intermediate support ring 18, each of the upper base rings 16 and 18 secured to the base ring 14 at at least two points 20 opposite one another along the base ring for defining the skeletal support framework 12 of the present invention.

For purposes of material, the support rings 14, 16, and 18 would be constructed of materials suitable for forming a framework structure which would have high elasticity and/or resilience. Such characteristics may also be combined with high tensile and/or compressive strength. Examples of suitable materials are spring steel, fiber composite such as graphite, and highly flexible plastics.

In the layout of the frame 12, framework 12 in its design is first constructed by laying out the base member 14, which would, in the preferred embodiment, make contact with the surface such as the ground substantially along its entire length, and would function to serve as a suitable means for supporting the tent structure flat on the ground. The circular base ring 14 would be of a desired diameter when laid upon the ground. In attaching the intermediate ring 18 along the points of attachment 20 as seen in FIG. 1, base ring 14 is constrained with a temporary tie or the like by pulling the circle into the shape of an ellipse (FIG. 1) of a desired width 22. Next, the intermediate ring 18 is then constrained likewise into an ellipse, but unlike the base ring 14 is configured to have the two end loops 24 and 26 extend upward a distance above the base ring 14, and to be flush with base ring 14 only at the points of attachment 20. Likewise, the third or upper ring 16 is attached at attachment points 20 and is configured wherein the end loops 30 and 32 are formed in the shape of a "saddle" while likewise being attached to base ring 14 and intermediate ring 18, so that the loops 30 and 32 are at the highest most point 34 that the tent structure will accommodate. Therefore, as seen in FIG. 1, the three separate rings are configured so as to create a continuous skeletal framework with each end 36 of base ring 14, upward to the highest [most] point 34 at the top of the loops 30 and 32 of upper ring 16. It would be noted again that the bottom arcs of both the upper ring, and the intermediate ring 18 contact with and are congruent with the [the] opposite side of a shorter axis of the base ring 14, to form the attachment points and the skeletal framework. The upper saddle shaped ring 16 and the intermediate ring 18 are attached to the base ring at the points where the [congruently] *congruency* occurs, i.e., points 20.

Figure 2:
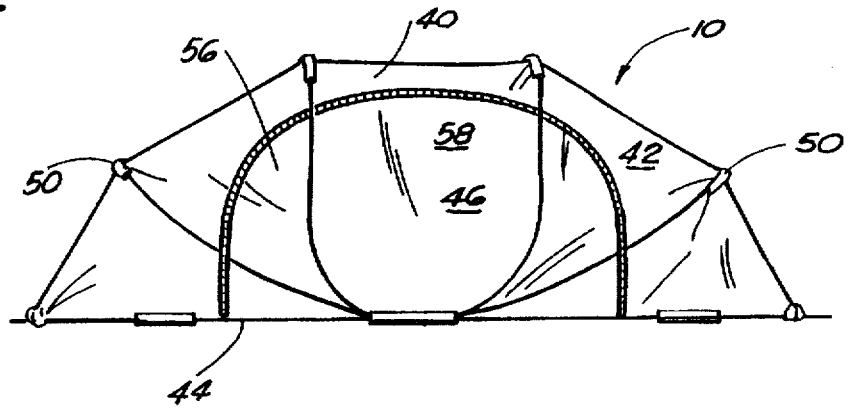
FIG. 2 represents a side view of the preferred embodiment framework of the apparatus of the present invention with a tent fabric covering thereupon.

Following the formation of the skeletal framework 12 as seen in FIG. 1, the tenting fabric 40 may then be applied over the configured rings as seen in FIG. 2, including an upper continuous layer of fabric 42 for serving as the enclosure of the tent over the framework 12, and the base of the fabric 44 continuing around and under base ring 14 for defining an enclosed area 46 within fabric 40 and defining the tent itself.

Figure 5:
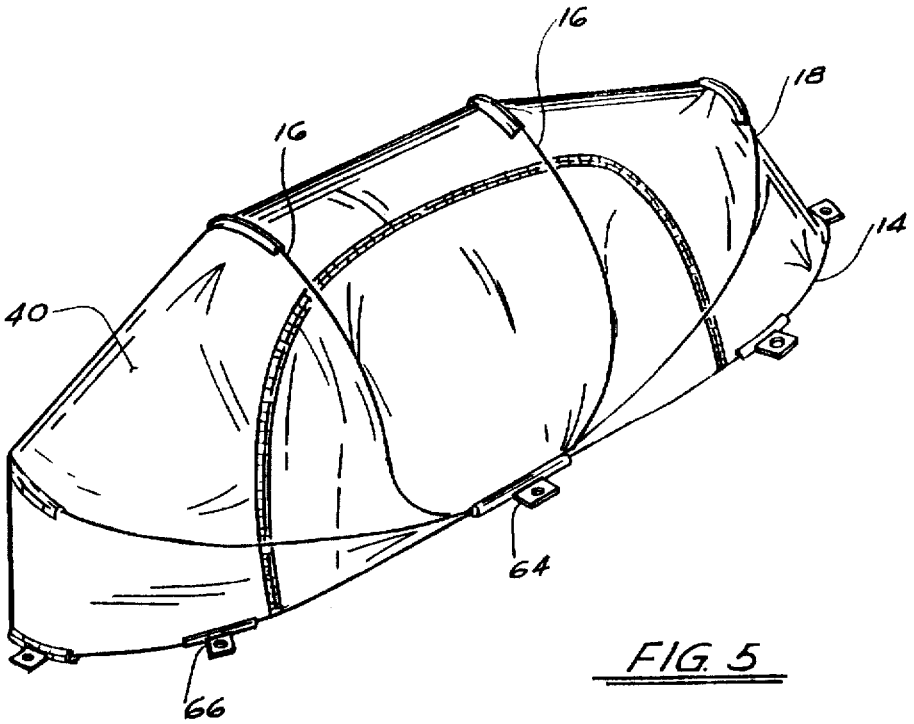
FIG. 5 represents an overall perspective view of an erected tent in the preferred embodiment of the apparatus of the present invention with tent grommets for securing the base ring of the tent.
Figure 7A:
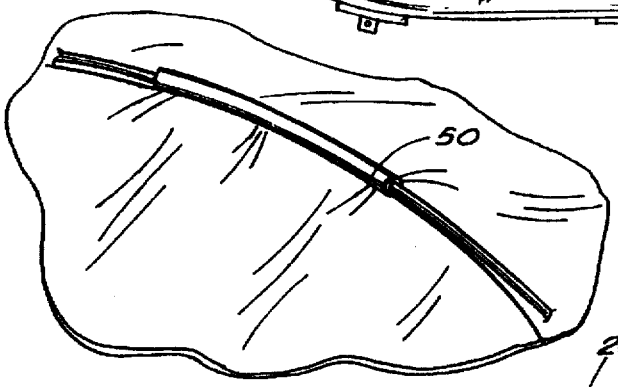
FIG. 7A illustrates the manner of attachment between the rings of the framework and the tent fabric in the present invention.
Figure 7:
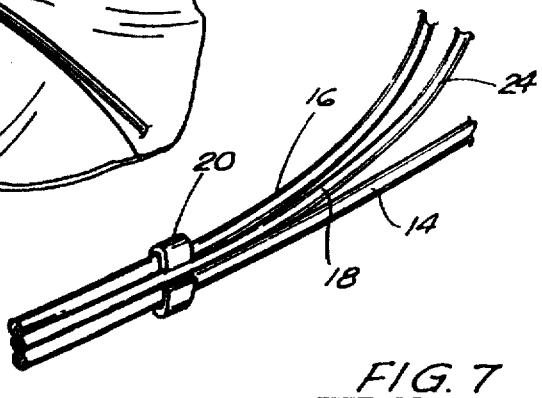
FIG. 7 represents an isolated view of the connection between the three ring members in the framework of the present invention.

As seen in the Figures, particularly FIGS. 2 and 7A, the tent fabric 40 is attached to the ring members 14, 16, and 18 through the use of an attachment loop 50, which serves to adhere the fabric 40 to the various rings 14, 16, and 18 respectively, so that the fabric is permanently affixed over the skeletal framework as seen in FIGS. 2 and 5. Further, as seen in FIGS. 2 and 5, tent 10 in this particular embodiment is exemplifying a side entry port 56, comprising [a] *an* arcuate flat member 58 which is zipped or attached to the tent 40 through zipping or the like, so that it may fold down onto the ground when in the open position and may be returned to its erected position as seen in FIGS. 2 and 5. This entry, or course, is quite standard in the present art of tent making.

Figure 3:
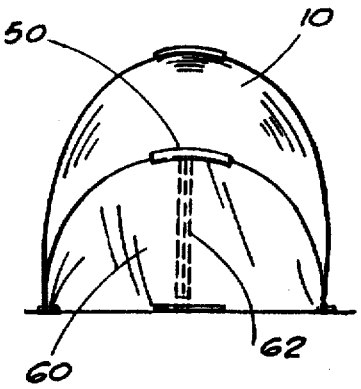
FIG. 3 represents an end view of the preferred embodiment of the apparatus of the present invention illustrating a side entry view.
Figure 4:
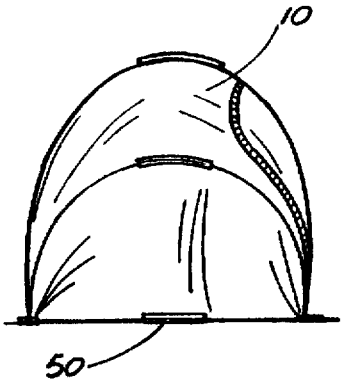
FIG. 4 represents an end view of the preferred embodiment illustrating a front entry view.

FIGS. 3 and 4 represent end views respectively of a tent of the type as illustrated in FIG. 2, with the exception that in FIG. 3, tent 10 is illustrating a side entry flap 60, which has a central vertical zipper 62 so that upon unzipping a person may crawl in through the end 60, and be present in the tent through that entry port. FIG. 4 simply illustrates a side end view of the tent as illustrated in FIG. 2.

Figure 6:
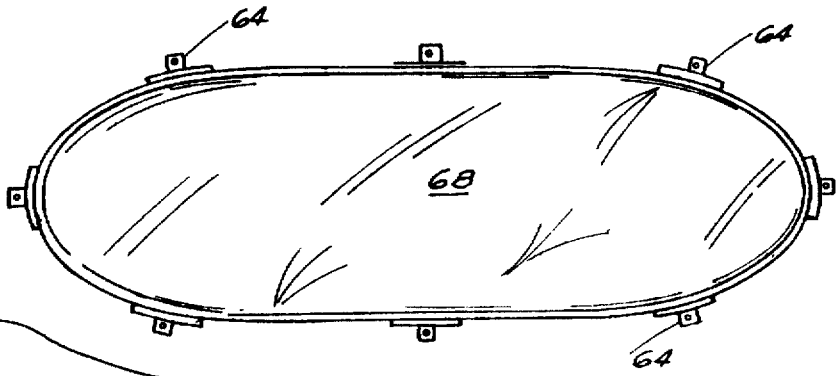
FIG. 6 represents a bottom view of the tent structure in FIG. 5.

In order to more properly affix tent 10 to the ground or to the surface that it is set upon, although in its preferred embodiment ring 14 would serve as an adequate base in support, there may be included a plurality of tie down grommets 64 which would be spaced along the outer perimeter of base ring 14 (FIG. 6) so that a peg or the like may be inserted through a port 66 in grommets 64 and maintain the tent very secure along its perimeter boarder. Again, this means of attachment is an alternate means of attachment, and usually the weight of tent 10 in itself as erected, as seen in FIG. 6, would be adequate to maintain a tent supported on the ground.

Figure 8:
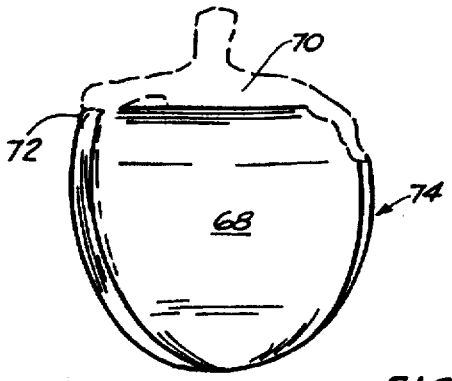
FIGS. 8–15 illustrate the method of storing the tent from the erected position of the present invention.
Figure 9:
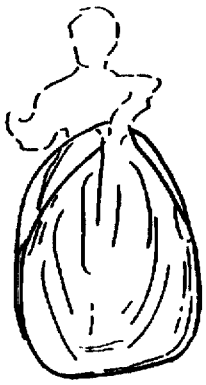
Figure 10:
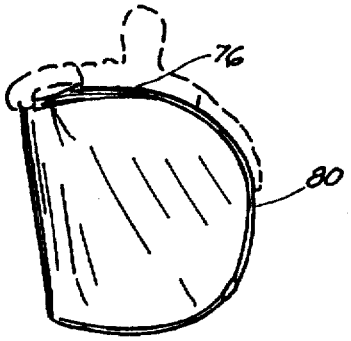
Figure 11:
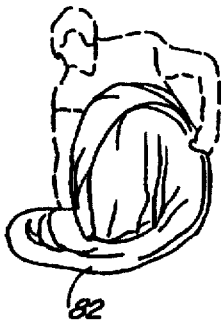
Figure 12:
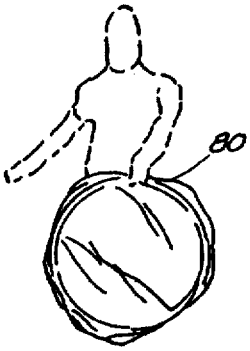
Figure 14:
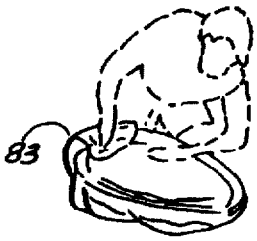
Figure 13:
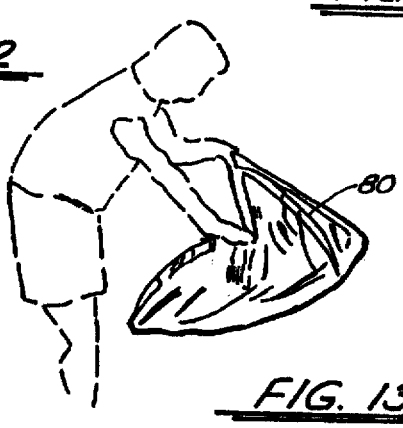
Figure 15:
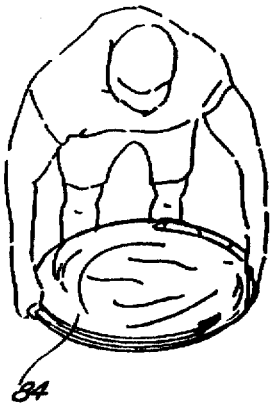

One of the more novel aspects of the present invention is the manner in which the tent may be easily configured from the erected configuration to the storage configuration by a single individual. This particular method is illustrated in FIGS. 8–15. However, it should be noted that if one were to view the Figures in the opposite manner, i.e., 15-8 one would likewise see the method in which the tent moves from the storage state to the fully erected state during erection. As seen in the Figures, in FIG. 8 there is noted an individual 70 grasping the ends 72 or the bottom 68 of the tent structure in drawing the ends 72 together as to form a claim 74 (FIG. 8). Next, the structure as seen in FIG. 9 is rotated 90° in the vertical axis so as that the bridge (convexity of the saddle shaped) 76 of the saddle shape in now perpendicular to the ground as illustrated in FIG. 10. Grasping the bottom ends 80 of the saddle in one hand, the to member is folded down so that it is inserted inside the margin of the bottom 82 of the bridge of the saddle as seen in FIG. 11. Next, the structure is rotated so that the two interlapping and overlapping ends of the bridge of the saddle are now secured against the ground as illustrated in FIG. 12. Next, each end grasp in the hand is returned in the second step above to a separate hand and tucking or folding one side beneath and within the other while exerting a general downward pressure causing the spherical configuration of the structure to collapse into a disk as illustrated in FIGS. 14 and 15. The disk shape should be secured for storage by placing an elastic band, tie, or other restraints across the diameter of a disk. In various other designs covers for the structure may be utilized wherein the disk may be slipped into the cover for storage.

Figure 16:
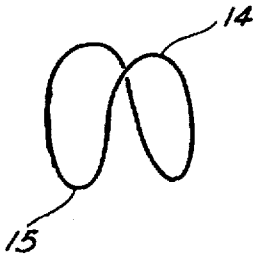
FIGS. 16–20 illustrate representational views in the steps of reconfiguring the frame of the present invention from the erected position to the stored position.
Figure 17:
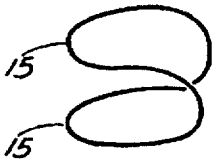
Figure 18:
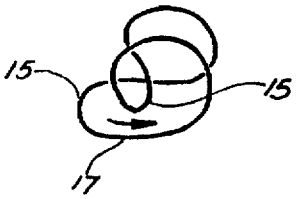
Figure 19:
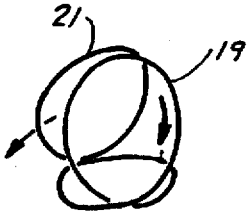
Figure 20:
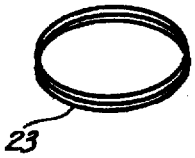

For a more complete representational view of the folding of the framework, reference is made to FIGS. 16 and 20 wherein there is illustrated for example, upper ring 14 which represents the series of rings clasp into a single "saddle shape", rotated 90° so that the lower most ends 15 are turned perpendicular to the ground, and a first end 15 is then tucked inside of the second end portion 15 in the direction of Arrow 17. Following the tucking in of the first end 15, as seen in FIG. 18, reference is made to FIG. 19 where the two side portions 19 and 21 then are folded downward upon one another to form the three layered ring 23 as seen in FIG. 20. This representational view illustrates the manner in which the tent as illustrated in FIG. 1 and 2 can be folded into the ring configuration and be stored away. Likewise, if one were to reverse the sequences as illustrated in FIGS. 16–20, one could visually see the tent unfolding from the stored configuration as seen in FIG. 20 to the full upright configuration as seen in FIG. 16, this unfolding of the tent from FIGS. 20 through FIGS. 16 being accomplished instantaneously, so that the tent is self-erecting over a matter of seconds from the folded position in FIG. 20 to the full upright and extended position as seen in FIG. 16 in representational view and in FIG. 2 in full erected view.

Figure 21:
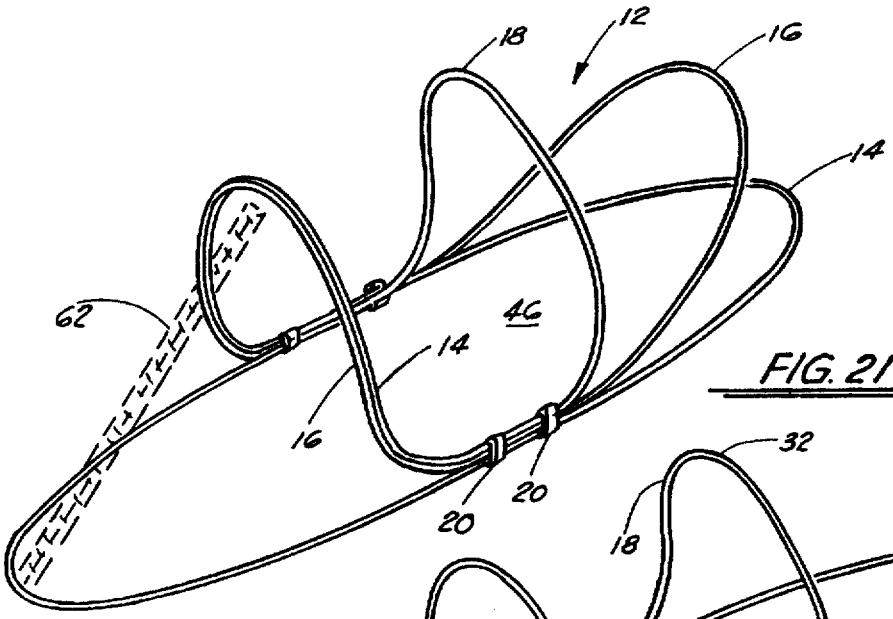
FIGS. 21 and 22 represent alternate embodiments of the framework structure in the self-erecting tent of the present invention.
Figure 22:
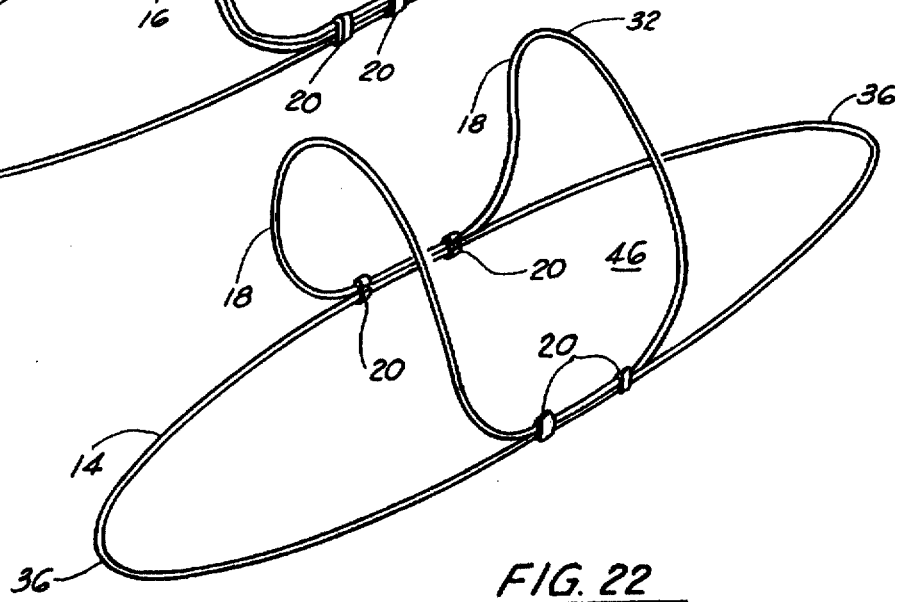

For purposes of alternate embodiments, FIGS. 21 and 22 illustrate two possible configuration of the rings 14, 16, and 18 wherein if one wanted a full side entry as illustrated in phantom view by zipper 62, the second loop of ring 16 rather than extending outward as seen in its first loop, would be secured and held in place against ring 14 so that there would be no intermediate rings extending through the outer most end of tent frame 12, and therefore, allowing a full sipper along that wall to allow full access into the tent. Likewise, in FIG. 22, intermediate ring could be eliminated altogether, so that the tent would be simply constructed of the base ring 14, the upper ring is secured at point 20 and therefore forming a basic framework for a tent, yet not having the full extension of the sidewalls as seen in FIG. 2 which would be kept expanded outward by intermediate range 16.

It is foreseen that the present invention constructed is quite novel in the view that the framework and the fabric for the tent are maintained permanently attached to one another and whether it be in the stored configuration or the upright configuration. Further, the desirability characteristics of the frame made from material which possess a "memory" for its original shape once deformed allows it to spontaneously release its stored energy deformation when it moves into its complete erect state.

The suitable webbing, fabric or tenting may include by way of example and without limitation waterproof fabric such as treated cotton, nylons, etc., suitable for shelter, from the elements, course weave fabrics, or webbings suitable for air vents or mosquito netting, insulated materials that are suitable for extreme cold weather climates, reflective materials that provide shelter from intense solar radiation, and insulated and/or reflective materials that may intercept, reflect, cancel or contain the ignition or transmission of specific frequencies of energy.

The later is further exemplified by portable shelters for military use that do not transmit [infer red] *infrared* or radiation or low frequency radio emissions so as to provide a negative signature to remote sensing devices. Other military and recreational uses may employ tinting materials bearing camouflage patterns so is to provide blinds or escape aerial protection.

Examples of sheet materials or membranes having desirable characteristics for use with the shelter are impermeable fabrics, membrane or plastics for use in adverse or toxic chemical environments, permeable membrane or permeable sheeting for the selective ignition of gaseous or fluid constituents in the insulated and/or reflective materials referred to above.

It is important to note that the features in the self-erecting tent provide for a structure which can be placed in the stored position and instantaneously form a self-erecting tent having a complete base portion for moving into. This would be critical in instances where one is faced with adverse weather, or darkness, or because of a handicap or the like, would be unable to erect a tent in the present state of the art. The manner of construction of this tent allows instant self erection, and provides for a very easy and simple manual steps for reconfiguring the tent to the stored configuration.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

[1. A self-erecting tent structure, comprising:

(a) a first continuous resilient substantially closed planar loop base support member contacting the surface upon which the tent is resting when erected:

(b) at least a second continuous resilient closed loop support member, secured to the closed loop base support member at at least two points, with portions of the second closed loop support member positioned apart from and above portions of base support member; and (c) a fabric membrane extending around and enclosing the base and second continuous support members, and including an entry port, for defining an enclosure within the fabric positioned around the first and second support members.]

2. The structure in claim [1.] *12* wherein there is further included a third continuous resilient closed loop support member intermediate the first and second resilient support members.

3. The structure in claim [1.] *12* wherein the base support member makes contact with the ground or other surface substantially around its entire length.

4. The structure in claim [1.] *12* wherein the continuous support members are attached together at two points along the length of the support members, the attachment points being substantially opposite one another mid-way along the length of the support members.

5. The structure in claim [1.] *12* wherein the first continuous support member is substantially in the shape of an ellipse.

6. The structure in claim [1.] *12* wherein the tent fabric membrane comprises a continuous shell around the framework defined by the support members.

[7. A self-erecting tent, comprising:

(a) a first base closed-loop flexible support member defining a substantially planar ellipsoid base portion, and at all points contacting the surface upon which the tent rests;

(b) a second closed loop flexible support member attached at two points, substantially opposite one another, to the base support member, with portions of the second member extending a distance upward and above portions of the base member;

(c) a third closed loop flexible support member likewise attached to the first base support member, and at the same points as the second support member, the ends of which extend substantially vertical to the plane of the base support member, the first, second and third support members defining a framework for the tent in the erected configuration; and (d) a fabric membrane encapsulating the base, second, and third support members, for defining the erected tent enclosure, and including means for entry into the enclosure through the fabric membrane.]

[8. The tent structure in claim 7, wherein the support members, and the fabric membrane, may be brought together and reconfigured to define substantially a disk when the tent is in the stored position.]

[9. The tent structure in claim 7, wherein the structure moves from a first storage position to a second fully erected position by the instantaneous unfolding of the support members into the fully erected configuration.]

[10. A self-erecting tent having a framework first, comprising a ellipsoid shaped substantially planar continuous loop base member making contact with the ground around its entire length; a second continuous closed loop member attached at at least two points to the base closed loop member, portions of the second loop member extending a distance away and upward from the base loop member for partially defining the framework of the tent; a third closed loop support member, likewise attached at at least two points to the first and second closed loop members, and extending substantially vertically from the plane of the first base member, for defining the uppermost point of the tent framework; a fabric membrane positioned around and enclosing the framework, for defining the tent enclosure when the members are in the support position; the support members, resiliently bendable from the support configuration to a tightly formed disk configuration, for defining the stored configuration, so that when the tent is in the stored configuration, the first, second, and third support members can reform instantaneously into the support configuration for defining a tent enclosure able to house persons therein.]

[11. A self erecting tent structure having a fabric like tent floor and outer wall comprising:

(a) a first continuous closed loop tent support member defining a base support member that lies in a generally flat plane in an unfolded position, and the perimeter of the tent floor contacting the surface upon which the tent is resting when the tent is in use;

(b) at least a second continuous closed loop tent support member, secured to the first closed loop tent support member and including raised portions that extend above the base support member when the tent is in use; and (c) a fabric membrane carried by the first and second support members for defining an enclosure including a floor portion spanning the first, closed loop tent support member so that the floor is supported substantially along its periphery by the first closed loop support member.]

*12. A self-erecting tent structure, comprising:*

*(a) a first continuous resilient closed substantially planar loop base support member contacting the surface upon which the tent is resting when erected;*

*(b) at least a second continuous resilient closed loop support member, secured to the closed loop base support member at at least two points; and*

*(c) a fabric membrane extending around and enclosing the base and second continuous support members with portions of the second closed loop support member being bent to position apart from and above the base support member, and including an entry port for defining an enclosure within the fabric positioned around the first and second support members.*

*13. A self-erecting tent structure, comprising:*

*(a) a first continuous resilient closed substantially planar loop base support member contacting the surface upon which the tent is resting when erected;*

*(b) at least a second continuous resilient closed loop support member, secured to the base support member at least two points, with portions of the second closed loop support member being bent to a position apart from and above portions of the base support member; and*

*(c) a fabric membrane extending around and enclosing the base and second continuous support member and including an entry port for defining an enclosure within the fabric positioned around the first and second support members.*

*14. A self-erecting tent structure, comprising:*

*(a) a first continuous at least substantially closed substantially planar loop base support member contacting the surface upon which the tent is resting when erected;*

*(b) at least a second continuous at least substantially closed loop support member, secured to the base support member at least two points, with portions of the second closed loop support member being bent to a position apart from and above portions of the base support member and wherein the base and second continuous support members comprise a material which possesses a memory for its original shape such that, once bent, the material is capable of spontaneously releasing its stored energy; and*

*(c) a fabric membrane extending around and enclosing the base and second continuous support members and including an entry port for defining an enclosure within the fabric positioned around the first and second support members.*

*15. A self-erecting tent structure, comprising:*

*(a) a first continuous resilient at least substantially closed substantially planar loop base support member contacting the surface upon which the tent is resting when erected;*

*(b) at least a second continuous resilient at least substantially closed loop support member; and*

*(c) a fabric membrane extending around and enclosing the base and second continuous support members so as to secure the base support member to the second continuous support member at least two points with portions of the second closed loop support member being bent to a position apart from and above the base support member, and including an entry port for defining an enclosure within the fabric positioned around the first and second support members.*

*16. A self-erecting tent structure, comprising:*

*(a) a first continuous resilient at least substantially closed substantially planar loop base support member contacting the surface upon which the tent is resting when erected;*

*(b) at least a second continuous resilient at least substantially closed loop support member, secured to the base support member at least two points, with portions of the second closed loop support member located apart from and above portions of the base support member; and*

*(c) a fabric membrane attached to the base and second continuous support member and including an entry port for defining an enclosure within the fabric positioned around the first and second support members, and wherein the fabric bends said second continuous support member so as to provide a tent structure that is self-erecting.*

*17. A self-erecting tent structure having a fabric like tent floor and outer wall comprising:*

*(a) a first continuous resilient closed loop tent support member defining a base support member that lies in a generally flat plane in an unfolded position, and the perimeter of the tent floor contacting the surface upon which the tent is resting when the tent is in use;*

*(b) at least a second continuous resilient closed loop tent support member, secured to the first closed loop tent support member and being bent so as to include raised portions that extend above the base support member when the tent is in use; and*

*(c) a fabric membrane carried by the first and second support members for defining an enclosure including a floor portion spanning the first, closed loop tent support member so that the floor is supported substantially along its periphery by the first closed loop support member.*

*18. A self erecting tent structure having a fabric like tent floor and outer wall comprising:*

*(a) a first continuous resilient at least substantially closed loop tent support member defining a base support member that lies in a generally flat plane in an unfolded position, and the perimeter of the tent floor contacting the surface upon which the tent is resting when the tent is in use;*

*(b) at least a second continuous resilient at least substantially closed loop tent support member, secured to the first closed loop tent support member and being bent so as to include raised portions that extend above the base support member when the tent is in use; and*

*(c) a fabric membrane attached to the first and second support members for defining an enclosure including a floor portion spanning the first, closed loop tent support member so that the floor is supported substantially along its periphery by the first closed loop support member.*

* * * * *